UNITED STATES PATENT OFFICE 2,235,149

PROCESSING OF MIXED POLYMERS OF CONJUGATED DIENES AND UNSATURATED NITRILES

Roscoe H. Gerke, Nutley, N. J., assignor to United States Rubber Company, New York, N. Y., a corporation of New Jersey No Drawing. Application April 11, 1939, Serial No. 267,321

12 Claims. (Cl. 260—84)

The present invention relates to processing of rubber-like masses from polymerizable butadiene hydrocarbons and polymerizable nitriles, i. e. products of the conjoint polymerization of conjugated dienes of the type of butadiene and isoprene with alpha-beta-unsaturated nitriles of the general formula

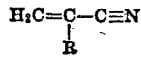

wherein R means hydrogen or alkyl, and more particularly to certain plastic conversion products thereof.

One such polymerization product, which is a rubber-like material, is known by the name of Perbunan, and is said to be butadiene-acrylic-acid-nitrile mixed polymerizate, that is, a co-polymer of butadiene for example, 1,3 butadiene and of acrylic nitrile. The production of rubber-like products of the type of Perbunan is disclosed in U. S. P. 1,973,000, patented September 11, 1934. One method of preparing the co-polymer is by emulsification of a solution of the butadiene and nitrile (in a ratio such as shown in Example 1 of said patent) with 60 parts of water containing 5% of the hydrochloride of diethylaminoethyl oleylamide. One-half part of trichloracetic acid is added. The mixture is polymerized by heating it from 3 to 4 days at 50–60° C. At the end of this period, the emulsion is coagulated. The coagulum is dried and roughly sheeted.

The material so prepared as shown by the above patent, has many of the properties of rubber; in particular, it shows long range elasticity and can be vulcanized with sulphur in much the same way as can rubber. Commercially, Perbunan is of importance because of its excellent resistance to swelling in aliphatic hydrocarbons, its superior heat resistance, and in some cases, its high resistance to abrasion. However, materials of the type of Perbunan differ from rubber in that (1) they do not soften progressively on prolonged milling, and (2) the surface of raw Perbunan is extremely dry and non-tacky.

Accordingly it is an object of the invention to provide plastic conversion products from Perbunan, characterized by decreased viscosity and improved tack.

Accordingly, the present invention comprises the preparation of said conversion products by heating a mixture of the co-polymer with a small proportion of an organic nitroso compound selected from the group consisting of p-nitroso-dimethylaniline, nitroso-beta-naphthol, and p-nitroso-diethyl-aniline, for a time and at a temperature sufficient to reduce the viscosity of the material and confer a greater tack than possessed by the original material.

When Perbunan is heated either alone, or after mixing with the usual compounding ingredients, a stiffening takes place which appears to be an incipient vulcanization. When, however, p-nitroso-dimethylaniline or equivalent nitroso compound is mixed with Perbunan and the resulting mixture is heated for a suitable time at a given temperature, a softening i. e., decrease in viscosity, occurs. Prolonged heating causes an ultimate increase in viscosity. It is to be noted than this latter phenomenon is in sharp distinction to the behavior of mixtures of rubber and aromatic nitroso compounds, which soften progressively and continuously when heated in an atmosphere of air or oxygen.

Treatment of Perbunan with p-nitroso-dimethyl-aniline or the equivalent in the way outlined above causes a significant increase in tack of the raw conversion product, compared to the tack of untreated Perbunan.

The conversion products can be vulcanized in the conventional manner. The vulcanizates retain the excellent oil-resistant properties of the original Perbunan.

The preferred temperature for the heat treatment is in the range from about 227° F. to about 297° F. The time of heating required for a desired decrease in viscosity decreases with increased temperature of heating, and may readily be determined in any given instance; for example, heating for 30 minutes at 275° F. gives an optimum effect equivalent to heating for 60 to 120 minutes at 227° F.

The mixture of Perbunan and nitroso compound may be heated between platens, or in steam, or in air. The process is therefore not dependent upon the presence of air or oxygen.

The conversion products of the invention are more plastic than the original Perbunan, in that they can be stretched to thin continuous films. Untreated raw Perbunan when stretched gives a knotty torn sheet. As noted above, heat treatment with p-nitroso-dimethylaniline, etc., also improves the tack and lowers the viscosity of the resulting material. Processing characteristics are thereby improved.

The following examples are given to illustrate the invention with preferred chemicals, namely, p-nitroso-dimethylaniline and alpha-nitroso-beta-naphthol; the parts are by weight based on 100 parts of Perbunan:

Example 1

Five per cent of p-nitroso-dimethylaniline was added to Perbunan on the mill. The resulting mix was heated in the press for 5 minutes at 275° F. The viscosity as measured on the Mooney shearing disk viscometer was found to be 72. The viscosity of Perbunan, without added p-nitroso-dimethylaniline, after heating 5 minutes at 275° F., was found to be 145. The p-nitroso-dimethylaniline-Perbunan mixture after heating was smooth, plastic and tacky.

Example 2

Five per cent of alpha-nitroso-beta-naphthol was added to Perbunan, and the resulting mix heated in the press 30 minutes at 275° F. After heating the viscosity equalled 64. The control experiment of Perbunan heated without added ingredient, showed a viscosity of 159.

Example 3

Five per cent of p-nitroso-dimethylaniline was added to Perbunan, and the resulting mix heated in air 30 minutes at 275° F., the viscosity of the resulting product being 72.

Effective proportions of the nitroso compound have been found to be from about 1 to about 10 parts per 100 parts of Perbunan. The preferred proportion is about 5 parts per 100 parts of Perbunan.

The invention seems to be specific to the nitroso compounds referred to above since other nitroso compounds such as nitrosobenzene, diphenylnitrosamine, p-nitrosophenol fail to show any softening action on Perbunan.

The present invention allows of converting Perbunan and similar products as alleged above, to material which can be processed in the factory in a manner similar to those in use for processing rubber in the manufacture of rubber articles, as a result of decreasing the viscosity and increasing the tack of the original Perbunan product.

Having thus described my invention, what I claim and desire to protect by Letters Patent is:

1. A process of preparing a plastic conversion product of a mixed polymer of a conjugated 1,3 diene with an alpha-beta-unsaturated nitrile, which comprises heating a mixture containing said mixed polymer and an organic nitroso compound selected from the group consisting of p-nitroso-dimethyl aniline, nitroso-beta-naphthol, and p-nitroso-diethyl aniline, for a time and at a temperature sufficient to reduce the viscosity of the mixed polymer and confer a greater tack thereon than possessed by the original material.

2. A process of preparing a plastic conversion product of a mixed polymer of a 1,3 diene with an unsaturated nitrile of the general formula $$H_2C=C-C\equiv N$$
$$|$$
$$R$$

wherein R means one of the radicals hydrogen, alkyl, which comprises heating a mixture containing said mixed polymer and a nitroso beta naphthol, for a time and at a temperature sufficient to reduce the viscosity of the mixed polymer and confer a greater tack thereon than possessed by the original material.

3. A process of preparing a plastic conversion product of a mixed polymer of a 1,3 diene with an unsaturated nitrile of the general formula $$H_2C=C-C\equiv N$$
$$|$$
$$R$$

wherein R means one of the radicals hydrogen, alkyl, which comprises heating a mixture containing said mixed polymer and p-nitroso-dimethyl aniline, for a time and at a temperature sufficient to reduce the viscosity of the mixed polymer and confer a greater tack thereon than possessed by the original material.

4. A process of preparing a plastic conversion product of an elastic co-polymer of butadiene and acrylic nitrile which comprises heating a mixture containing said co-polymer and an organic nitroso compound selected from the group consisting of p-nitroso-dimethyl aniline, nitroso-beta naphthol, and p-nitroso-diethyl aniline, for a time and at a temperature sufficient to reduce the viscosity of the mixed polymer and confer a greater tack thereon than possessed by the original material.

5. A plastic conversion product of a mixed polymer of a 1,3 diene with an unsaturated nitrile of the general formula $$H_2C=C-C\equiv N$$
$$|$$
$$R$$

wherein R means one of the radicals hydrogen, alkyl, containing combined therein an organic nitroso compound selected from the group consisting of p-nitroso-dimethyl aniline, nitroso-beta-naphthol, and p-nitroso-diethyl aniline.

6. A plastic conversion product of an elastic co-polymer of butadiene and acrylic nitrile containing combined therein a nitroso-beta-naphthol.

7. A plastic conversion product of an elastic co-polymer of butadiene and acrylic nitrile containing combined therein p-nitroso-dimethyl aniline.

8. A vulcanizate obtained from a vulcanizable mix comprising a plastic conversion product as set forth in claim 5.

9. A vulcanizate obtained from a vulcanizable mix comprising a plastic conversion product as set forth in claim 6.

10. A vulcanizate obtained from a vulcanizable mix comprising a plastic conversion product as set forth in claim 7.

11. A process of preparing a plastic conversion product of an elastic co-polymer of a butadiene and acrylic nitrile which comprises heating a mixture containing said co-polymer and an organic nitroso compound selected from the group consisting of p-nitroso-dimethyl aniline, nitroso-beta naphthol, and p-nitroso-diethyl aniline, for a time and at a temperature sufficient to reduce the viscosity of the mixed polymer and confer a greater tack thereon than possessed by the original material.

12. A plastic conversion product of an elastic co-polymer of a butadiene and acrylic nitrile containing combined therein a nitroso-beta-naphthol.

ROSCOE H. GERKE.